United States Patent
Sipe et al.

(10) Patent No.: US 8,886,953 B1
(45) Date of Patent: Nov. 11, 2014

(54) IMAGE PROCESSING

(75) Inventors: Michael Andrew Sipe, Pittsburgh, PA (US); Hugo Botelho Barra, San Francisco, CA (US); Henry Will Schneiderman, Pittsburgh, PA (US); Rachel Leah Garb, Mountain View, CA (US); Helena Roeber, Palo Alto, CA (US); Christian Robertson, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/617,454

(22) Filed: Sep. 14, 2012

(51) Int. Cl.
  *G06F 21/00* (2013.01)
  *G06F 21/32* (2013.01)
  *H04L 29/06* (2006.01)
  *H04L 9/32* (2006.01)

(52) U.S. Cl.
  CPC .............. *G06F 21/32* (2013.01); *H04L 63/0861* (2013.01); *H04L 9/3231* (2013.01)
  USPC ........................................................ 713/186

(58) Field of Classification Search
  CPC .... G06F 21/32; H04L 63/0861; H04L 9/3231
  USPC ........................................................ 713/186
  See application file for complete search history.

(56) References Cited

U.S. PATENT DOCUMENTS

| | | | |
|---|---|---|---|
| 6,829,384 B2 | 12/2004 | Schneiderman et al. | |
| 6,882,864 B2 * | 4/2005 | Miyake | 455/556.1 |
| 7,194,114 B2 | 3/2007 | Schneiderman | |
| 7,224,850 B2 | 5/2007 | Zhang et al. | |
| 7,227,976 B1 | 6/2007 | Jung et al. | |
| 7,336,821 B2 | 2/2008 | Ciuc et al. | |
| 7,612,794 B2 | 11/2009 | He et al. | |
| 7,848,566 B2 | 12/2010 | Schneiderman | |
| 7,881,505 B2 | 2/2011 | Schneiderman et al. | |
| 7,965,875 B2 | 6/2011 | Ionita et al. | |
| 8,131,024 B2 * | 3/2012 | Haynes et al. | 382/118 |
| 8,165,354 B1 * | 4/2012 | Zhao | 382/118 |
| 8,261,090 B1 * | 9/2012 | Matsuoka | 713/186 |
| 8,265,422 B1 * | 9/2012 | Jin | 382/275 |
| 2007/0116380 A1 | 5/2007 | Ciuc et al. | |
| 2007/0154095 A1 | 7/2007 | Cao et al. | |
| 2009/0304237 A1 * | 12/2009 | Yoshikawa et al. | 382/116 |
| 2010/0026833 A1 * | 2/2010 | Ciuc et al. | 348/222.1 |
| 2010/0138914 A1 * | 6/2010 | Davis et al. | 726/19 |
| 2011/0080616 A1 * | 4/2011 | Yang et al. | 358/3.26 |
| 2012/0120186 A1 * | 5/2012 | Diaz et al. | 348/36 |

OTHER PUBLICATIONS

Wang et al., A novel approach for hman face detection from color images under complex background, 2001, Retrieved from the Internet <URL: sciencedirect.com/science/article/pii/S0031320300001199>, pp. 1-10 as printed.*

(Continued)

*Primary Examiner* — Michael Chao
(74) *Attorney, Agent, or Firm* — Shumaker & Sieffert, P.A.

(57) ABSTRACT

A computing device includes an image capture device, a display, and at least one processor. The image capture device is configured to capture a digital enrollment image of a face of an authorized user and a digital authentication image of a face of an authenticating user. The display is configured to present the enrollment and authentication images. The at least one processor is configured to automatically alter the authentication image for presentation by the display and compare the authentication image to the enrollment image to unlock the computing device for use by the authenticating user.

19 Claims, 3 Drawing Sheets

(56) References Cited

OTHER PUBLICATIONS

Shan et al., A Face-Unlock Screen Saver by Using Face Verification Based on Identity-Specific Subspaces, 2001, Retrieved from the Internet <URL: springerlink.com/content/79513bjxa9krlwd3/>, pp. 1-6 as printed.*

Lukac et al., Single-Sensor Camera Image Processing, 2008, Retrieved from the Internet <URL: comm.toronto.edu/~kostas/Publications2008/pub/bookchapters/bch10.pdf>, pp. 1-36 as printed.*

"Digital Face Beautification, an aesthetically pleasing discovery," retrieved from http://www.gizmodiva.com/beauty/digital_face_beautification_an_aesthetically_pleasing_, accessed on Feb. 21, 2012, 8 pp.

Huang et al. "Face Beautification and Color Enhancement with Scene Mode Detection," Dept. of Computer Science and Information Engineering, National Taiwan University, accessed on Feb. 21, 2012, 8 pp.

* cited by examiner

IMAGE PROCESSING

TECHNICAL FIELD

The present disclosure relates to processing images captured for use in facial recognition applications.

BACKGROUND

A user may activate or otherwise gain access to functionalities controlled by a computing device by "unlocking" the device. In some instances, a computing device may be configured to permit unlocking based on authentication information provided by the user. Authentication information may take various forms, including alphanumeric passcodes and biometric information. Examples of biometric information include fingerprints, retina scans, and facial images. A computing device may authenticate a facial image input using facial recognition technology.

SUMMARY

Examples according to this disclosure are directed to digital image processing for real-time images used in facial recognition computing device unlock functions. In one example, a method includes capturing, by an image capture device of a computing device, a digital authentication image of a face of an authenticating user, automatically altering, by the computing device, the authentication image for presentation on a display of the computing device, presenting the authentication image on the display, and comparing, by the computing device, the authentication image to a digital enrollment image to determine whether to unlock the computing device for use by the authenticating user, wherein the enrollment image represents a face of an authorized user of the computing device.

In another example, a computing device includes an image capture device, a display, and at least one processor. The image capture device is configured to capture a digital enrollment image of a face of an authorized user and a digital authentication image of a face of an authenticating user. The display is configured to present the enrollment and authentication images. The at least one processor is configured to automatically alter the authentication image for presentation by the display and compare the authentication image to the enrollment image to unlock the computing device for use by the authenticating user.

In another example, a computer-readable storage medium comprising instructions for causing at least one programmable processor to perform operations including capturing, by an image capture device of a computing device, a digital authentication image of a face of an authenticating user, automatically altering the authentication image for presentation on a display of the computing device, presenting the authentication image on the display, and comparing the authentication image to a digital enrollment image to determine whether to unlock the computing device for use by the authenticating user. The enrollment image represents a face of an authorized user of the computing device.

The details of one or more embodiments of the disclosure are set forth in the accompanying drawings and the description below. Other features, objects, and advantages of the disclosure will be apparent from the description and drawings, and from the claims.

DETAILED DESCRIPTION

A computing device may use facial recognition programs in various scenarios. For example, a computing device may use facial recognition programs to authenticate a user who attempts to gain access to one or more functions of the computing device or functions otherwise controlled by the computing device. In some cases, a computing device may store images of the faces of one or more authorized users, which may be referred to in the following examples as "enrollment images." When a user attempts to gain access to functionality of (or "unlock") the computing device, the computing device may capture an image of the user's face for authentication purposes, which may be referred to in the following examples as an "authentication image." The computing device may then use facial recognition programs to compare the captured authentication image to the enrollment images associated with authorized users. If the facial recognition programs determine an acceptable level of match between the authentication image and at least one enrollment image, the computing device may authenticate the user, and grant the unlock request.

Some users may express concern that the images they see of themselves in the facial recognition unlock process are unflattering. As such, this disclosure applies image processing techniques to "beautify" the image of a face of a user in real time for use in conjunction with the phone unlock feature. The image processing compensates for aesthetic problems caused by imaging conditions (lighting, camera distortions, etc.) or by time or genetics (wrinkles, uneven skin tone, etc.). Automatic alteration of facial images may include correction for geometric distortion from camera lenses, altering lighting to simulate diffuse lighting on face, applying skin smoothing filters, and applying virtual tanning or other skin tone alterations.

Figure 1A:
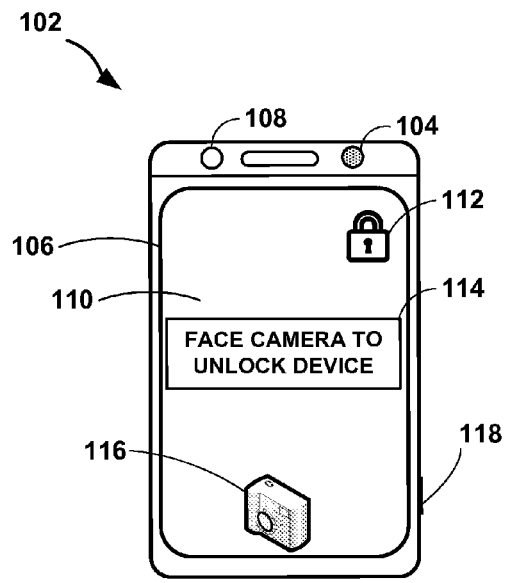
FIGS. 1A and 1B are conceptual diagrams illustrating an example computing device that may be used to automatically alter captured digital facial images of users, in accordance with one or more aspects of the present disclosure.
Figure 1B:
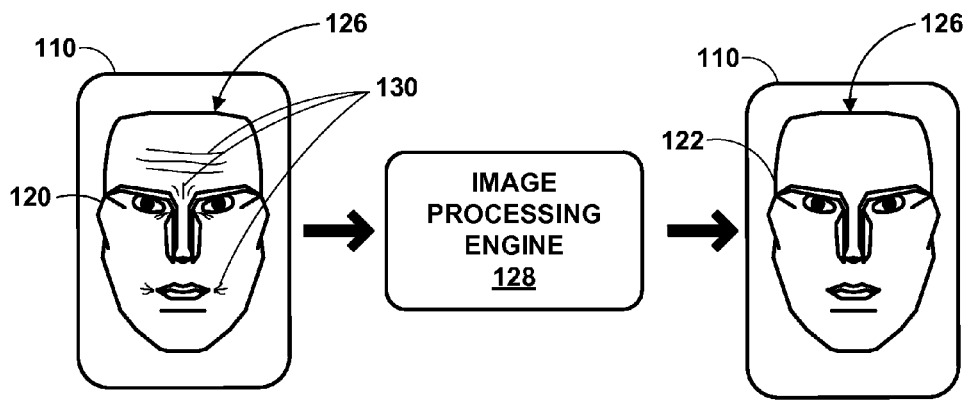

FIGS. 1A AND 1B are conceptual diagrams illustrating an example computing device that may be used to automatically improve facial images captured as part of a facial recognition process to unlock the device, in accordance with one or more aspects of the present disclosure. FIGS. 1A AND 1B illustrate computing device 102 that may capture facial images associated with a user (e.g., authorized user 126), analyze the captured facial image, and determine whether to allow or deny authentication based on the analysis. Computing device 102 is also configured to automatically alter the authentication image a user attempting to gain access to the device. In the example of FIGS. 1A AND 1B, computing device 102 includes a mobile telephone with a touchscreen interface including display 106. Computing devices employed in other examples according to this disclosure may include, be, or be part of one or more of a variety of types of devices, such as a tablet computer, netbook, laptop, desktop, personal digital assistant ("PDA"), set-top box, television, biometric door lock, and watch, among others.

Computing device 102 includes camera lens 104, display 106, and flashbulb 108. In the example of FIGS. 1A AND 1B, both camera lens 104 and flashbulb 108 may be part of or coupled to a front-facing camera of computing device 102. In other examples, one or both of camera lens 104 and flashbulb 108 may be part of or coupled to a rear-facing camera or other image capture device of computing device 102. One or both of the front-facing and rear-facing cameras may be capable of capturing still images, video, or both. In still other examples, camera lens 104 and flashbulb 108 may be integrated to form a single component of computing device 102.

Computing device 102 includes display device 106 that displays graphical user interface (GUI) 110 or other type of user interface. Display 106 may include a variety of display devices including, e.g., liquid crystal displays (LCD), light emitting diode (LED) displays, e-link, or other display. Additionally, display 106 and GUI 110 may include input/output capable devices such as a touchscreen or presence-sensitive display. As shown in the example of FIGS. 1A AND 1B, GUI 110 may include one or more GUI elements, such as lock indicator 112, unlock prompt 114, and capture icon 116.

Computing device 102 may be configured to operate in a "locked" mode, shown by lock indicator 112. In some examples, a user may actively configure computing device 102 to operate in locked mode. For example, a user may press a button (such as button 110) for a predetermined length of time to configure computing device 102 to operate in locked mode. In these and other examples, a user may tap, swipe, or otherwise interact with one or more elements of GUI 106, using an input/output capable display of computing device 102. Computing device 102 may also be configured to operate in locked mode by passive means. For example, a predetermined period of "inactivity" may configure computing device 102 to operate in locked mode. Inactivity may occur due to an absence of user interaction (e.g., through button presses, contact with an input/output capable display device, etc.). The predetermined time period that configures computing device 102 to operate in locked mode may be a default time period specified by a manufacturer of computing device 102, or may be programmed by an authorized user, such as authorized user 126.

In some examples, computing device 102 may utilize facial recognition technology to stop operation in locked mode. In other words, authorized user 126 may "unlock" computing device 102 by authentication methods that use facial recognition techniques to determine whether authorized user 126 is an authorized user of device 102. More specifically, authorized user 126 may set up a facial recognition application or embedded process of computing device 102 by storing an enrollment image that represents the face of authorized user 126. Authorized user 126 may cause an image capture device of computing device 102, e.g. a camera of device 102 to capture the enrollment using camera lens 104. Computing device 102 may store the enrollment image to one or more storage devices of computing device 102, and/or to a remote location, sometimes referred to as "cloud storage."

To unlock computing device 102 using facial recognition technology, a user (such as authorized user 126) may provide authentication image 120 that represents at least a portion of his/her face. In some examples, the user may actively cause a camera of computing device 102 to capture authentication image 120, which is illustrated in FIGS. 1A AND 1B as presented on GUI 110 after and/or during the image capture process. For example, the user may face camera lens 104 and press button 110 to cause the camera to capture authentication image 120, during and/or after which GUI 110 may function to present authentication image 120 on display 106. In another example, the user may tap, swipe, or otherwise interact with an area associated with capture icon 116 included in GUI 110. In still other examples, computing device 102 may automatically capture authentication image 120 in response to the user facing camera lens 104. As shown in the example of FIGS. 1A AND 1B, GUI 110 of computing device 102 may present unlock prompt 114 on display 106. In this example, unlock prompt 114 indicates that the user may simply face a camera, which may include or be otherwise coupled to camera lens 104, to cause computing device 102 to capture authentication image 120. In one example, when the user faces camera lens 104, computing device 102 may use a facial recognition program to determine that the image currently captured through camera lens 104 includes a representation of a human face and may then employ the facial image to unlock computing device 102 for use by authorized user 126.

Computing device 102 may then compare authentication image 120 with an enrollment image stored on a storage device of computing device 102, and determine whether or not the images are sufficiently similar to each other for facial recognition purposes. For example, computing device 102 may utilize one or more facial recognition programs to compare metrics associated with authentication image 120 to metrics associated with an enrollment image. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 102 may perform the comparison using a variety of facial recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, as well as any others appropriate for recognizing a digital image of a user's face. Based on comparison-based values, such as preprogrammed acceptable margins of error, facial recognition programs running on computing device 102 may determine whether or not authentication image 120 and the stored enrollment image are sufficiently similar to one another for facial recognition. In instances where the facial recognition programs grant a match, a user, e.g., authorized user 126 may successfully unlock computing device 102. Conversely, if the facial recognition programs deny a match, a user may be unable to unlock computing device 102, and computing device 102 may continue to operate in locked mode.

In one example, a user, e.g., authorized user 126 may believe the manner in which authentication image 120 captured by camera lens 104 and presented via GUI 110 on display 106 depicts their face is unflattering. As such, computing device 102 is configured to apply image processing techniques to "beautify" authentication image 120 of the face of user 126 in real time for use in conjunction with the unlock feature of computing device 102. For example, image processing engine 128 may be executed by computing device 102 to compensate for aesthetic problems caused by imaging conditions (lighting, camera distortions, etc.) or by time or genetics (wrinkles, uneven skin tone, etc.). Image processing engine 128 of computing device may include software, hardware, or combinations thereof. For example, image processing engine 128 may include one or more algorithms stored on memory of computing device 102 and executed by a processor of the device.

In the example of FIGS. 1A AND 1B, authentication image 120 of user 126 illustrates a number of effects of time on the user's face, including wrinkles 130. Image processing engine 128 of computing device 102, however, is configured to automatically alter authentication image 120 including wrinkles 130 to generate and present a "beautified" authentication image 122. The removal or reduction of wrinkles 130 shown in FIGS. 1A AND 1B is only one example by which image processing engine 128 of computing device 102 may automatically alter and beautify a digital image of the face of a user. In other examples, image processing engine 128 may alter an image of a user's face to improve other effects, including, e.g., correcting geometric distortion from camera lenses, altering lighting to simulate diffuse lighting on face, and applying virtual tanning or other skin tone alterations.

Figure 2:
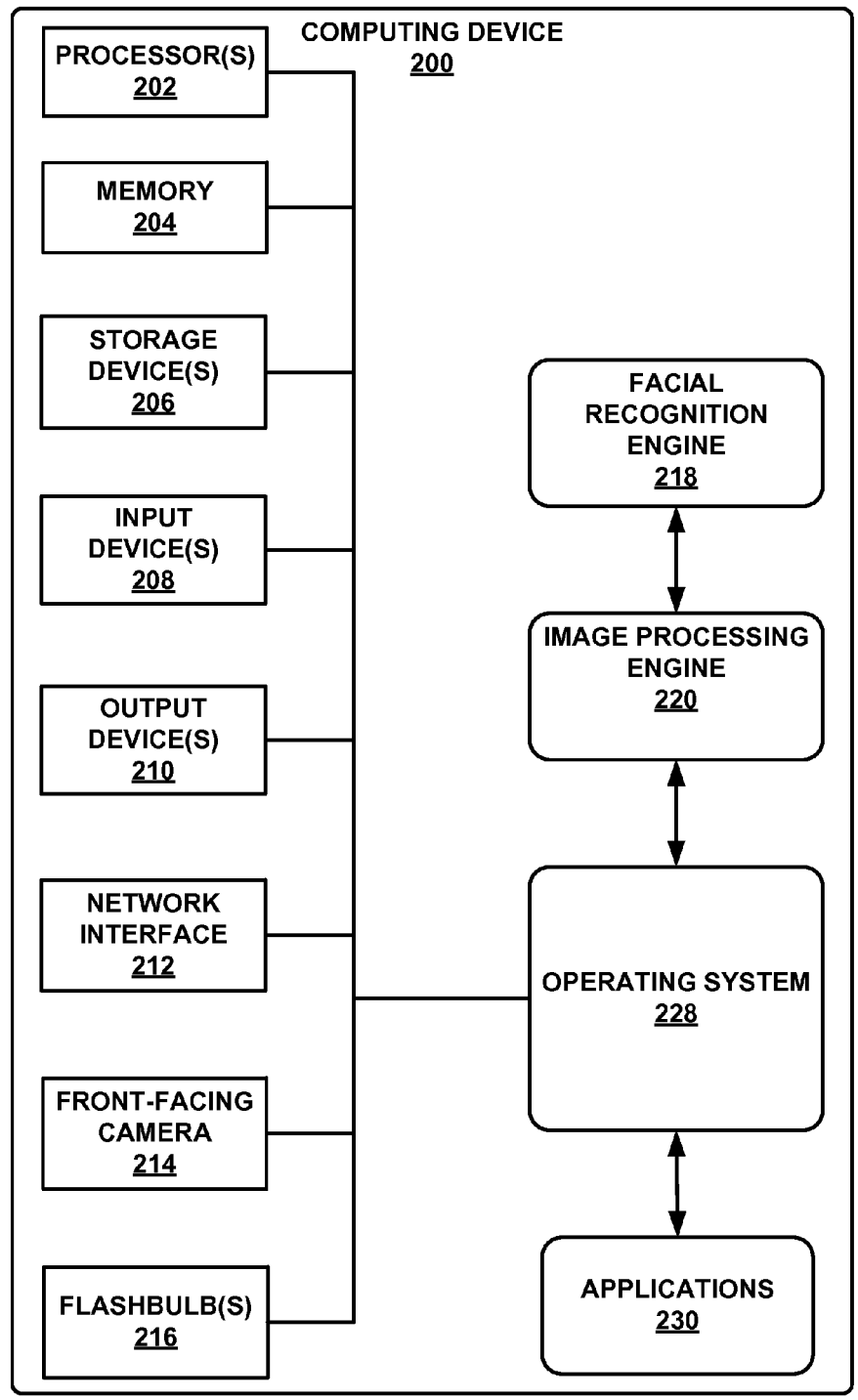
FIG. 2 is a block diagram illustrating details of an example computing device for detecting possible spoofing in captured facial images, in accordance with one or more aspects of this disclosure.

FIG. 2 is a block diagram illustrating details of an example computing device that is configured to automatically alter facial images during a device unlock procedure, in accordance with one or more aspects of this disclosure. Computing device 200 may be one non-limiting example of computing device 102 of FIGS. 1A AND 1B. As shown in the example of FIG. 2, computing device 200 includes one or more processors 202, memory 204, one or more storage devices 206, one or more input devices 208, one or more output devices 210, network interface 212, front-facing camera 214, and one or more flashbulbs 216. One or more processors 202 are, in some examples, configured to implement functionality and/or process instructions for execution within computing device 200. For example, processors 202 may process instructions stored in memory 204 and/or instructions stored on storage devices 206. Such instructions may include components of operating system 228, facial recognition engine 218, image processing engine 220, and one or more applications 230. Computing device 200 may also include one or more additional components not shown in FIG. 2, such as a power supply (e.g., a battery), a global positioning system (GPS) receiver, and a radio frequency identification (RFID) reader, among others.

Memory 204, in one example, is configured to store information within computing device 200 during operation. Memory 204, in some examples, is described as a computer-readable storage medium. In some examples, memory 204 is a temporary memory, meaning that a primary purpose of memory 204 may not be long-term storage. Memory 204, in some examples, is described as a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories. In some examples, memory 204 is used to store program instructions for execution by processors 202. Memory 204, in one example, is used by software (e.g., operating system 228) or applications (e.g., one or more applications 230) executing on computing device 200 to temporarily store information during program execution.

One or more storage devices 206, in some examples, also include one or more computer-readable storage media. In some examples, storage devices 206 may be configured to store greater amounts of information than memory 204. Storage devices 206 may further be configured for long-term storage of information. In some examples, storage devices 206 include non-volatile storage elements. Examples of such non-volatile storage elements include magnetic hard discs, optical discs, solid state discs, floppy discs, flash memories, forms of electrically programmable memories (EPROM) or electrically erasable and programmable memories, and other forms of non-volatile memories.

As shown in FIG. 2, computing device 200 may also include one or more input devices 208. One or more input devices 208 may be configured to receive input from a user through tactile, audio, video, or biometric channels. Examples of input devices 208 may include a keyboard, mouse, touchscreen, presence-sensitive display, microphone, one or more still and/or video cameras, fingerprint reader, retina scanner, or any other device capable of detecting an input from a user or other source, and relaying the input to computing device 200, or components thereof. Though shown separately in FIG. 2, one or both of front-facing camera 214 and flashbulbs 216 may, in some instances, be part of input devices 208.

Output devices 210 of computing device 200, in some examples, may be configured to provide output to a user through visual, auditory, or tactile channels. Output devices 210 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 210 may also include a touchscreen, presence-sensitive display, or other input/output capable displays.

Computing device 200, in some examples, also includes network interface 212. Computing device 200, in one example, utilizes network interface 212 to communicate with external devices via one or more networks, such as one or more wireless networks. Network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB. In some examples, computing device 200 utilizes network interface 312 to wirelessly communicate with external devices over a network.

Operating system 228 may control one or more functions of computing device 200 and/or components thereof. For example, operating system 228 may interact with image processing engine 220, applications 230, and may facilitate one or more interactions between applications 230 and one or more of processors 202, memory 204, storage devices 206, input devices 208, and output devices 210. As shown in FIG. 2, operating system 228 may interact with or be otherwise coupled to applications 230 and image processing engine 220 and components thereof. In some examples, image processing engine 220 may be included in operating system 228. In these and other examples, image processing engine 220 may be part of applications 230. In other examples, image processing engine 220 may be implemented externally to computing device 200, such as at a network location. In some such instances, computing device 200 may use network interface 212 to access and implement functions provided by image processing engine 220 and its components, through methods sometimes referred to as server side processing or cloud computing.

Facial recognition engine 218 may include software, hardware, and combinations thereof configured to compare authentication images of the face of an authenticating user to one or more enrollment images to authorize use of computing device 200, e.g. to unlock computing device 200 for use by the authenticating user. To unlock computing device 200 using facial recognition technology, an authentication image of the face of a user may be captured by front-facing camera 214. In some examples, the user may actively cause a front-facing camera 214 of computing device 200 to capture the authentication image. For example, the user may face front-facing camera 214 and press a button included in input device (s) 208 to cause the camera to capture the authentication image, during and/or after which a display included in output device(s) 210 may function to present the authentication image to the user. In another example, the user may tap, swipe, or otherwise interact with one or more components of input device(s), e.g., with a touchscreen display. As described above, in still other examples, computing device 200 may automatically capture the authentication image in response to the user facing front-facing camera 214.

Processor(s) 202 of computing device 200 may execute facial recognition engine 218 to compare the authentication image with one or more enrollment images, e.g., stored on memory 204 and/or storage device(s) 206 of computing device 200, and determine whether or not the authentication image is sufficiently similar to at least one of the enrollment images. For example, facial recognition engine 218 may utilize one or more facial recognition programs to compare metrics associated with the authentication image to metrics associated with an enrollment image. Some examples of metrics may include distances between facial elements (pupil-to-pupil, mouth width, etc.), contours of various facial features, pixilation corresponding to skin tone or texture, hair and/or eye color, and many others. Facial recognition programs executed by facial recognition engine 218 may perform the comparison using a variety of facial recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, as well as any others appropriate for recognizing a digital image of a user's face. Based on comparison-based values, such as preprogrammed acceptable margins of error, facial recognition engine 218 of computing device 200 may determine whether or not the authentication image and the stored enrollment image(s) are sufficiently similar to one another for facial recognition. In instances where facial recognition engine 218 grants a match, a user may successfully unlock computing device 200. Conversely, if facial recognition engine 218 denies a match, a user may be unable to unlock computing device 200, and computing device 200 may continue to operate in locked mode.

Image processing engine 220 may implement one or more of techniques for automatically beautifying the image of the face of user during a device unlock procedure executed, at least in part, by facial recognition engine 218. For example, image processing engine 220 may process an authentication image captured by front-facing camera 214 during a facial recognition unlock procedure, and cause output device(s) 210 including a display device to present the processed authentication image to a user. In various examples, image processing engine 220 may include one or more algorithms for executing a number of different image processing techniques to alter the authentication image.

In one example, computing device 200 captures an authentication image of a user's face, e.g., using front-facing camera 214. In some examples, authentication images may be captured by front-facing camera 214, or another image capture device of computing device 200, as a still image, e.g., as an image of the face of the user caught at one moment in time. In other examples, authentication images captured by front-facing camera 214 and automatically altered image processing engine 220 may include motion images, e.g., a series of images of the face of the user captured over time and that reflect motion of the user's face in front of the camera. Thus, computing device 200 may be configured to cause, automatically or through user interaction, camera 214 to capture a motion image of the face of a user that is presented on a display of output device(s) 210 as a live digital video feed of the face of the user facing the camera. Image processing engine 220 may automatically alter the image of the face of the user in real-time such that the motion image, or, video feed of the face of the user is altered before being presented on the display of output device(s) 210 to the user.

Regardless of the type of image or whether image processing engine 220 operates in real-time, after computing device 200 captures an authentication image (e.g., using front-facing camera 214), image processing engine 220 may begin processing the authentication image to automatically alter or "beautify" the facial image for presentation on a display of output device(s) 210. Image processing engine 220 may implement one or more image processing techniques to alter the authentication image of the face of user attempting to gain access to computing device 200 as part of a facial recognition device unlock procedure. For example, image processing engine 220 may alter at least one of contrast or brightness levels of one or more portions of the face of the user captured in the authentication image by camera 214 of computing device 200. In one example, image processing engine 220 may apply a high-pass and/or a low-pass filter to the entire or select portions of the authentication image. In one example, image processing engine 220 may apply one or more color transformations to areas of the face of the user captured in the authentication image that are identified as including skin. In one example, image processing engine 220 may apply a transform function associated with the lens of front-facing camera 214 to correct geometric distortions in the authentication image caused by the lens. These and other techniques may be applied by image processing engine 220 to, e.g., correct for geometric distortion from camera lenses, alter lighting to simulate diffuse lighting on the face, smooth the skin of the face of the user, and virtual tan or apply other skin tone alterations to the face.

Figure 3:
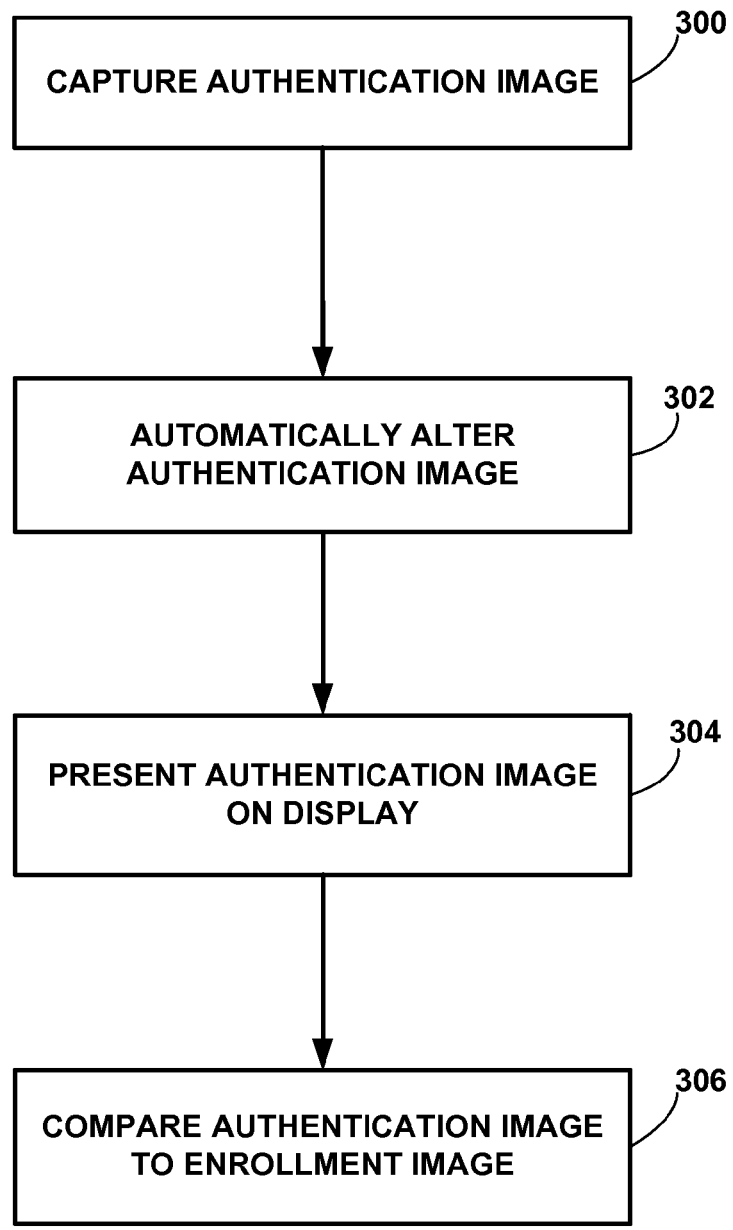
FIG. 3 is a flowchart illustrating an example process that may be performed by a computing device to detect possible spoofing in a captured facial image, in accordance with one or more aspects of this disclosure.

FIG. 3 is a flowchart illustrating an example method that may be performed by a computing device to employ facial recognition to unlock a computing device and to automatically alter the authentication image of the user employed during the unlock procedure. The example method of FIG. 3 includes capturing a digital authentication image of a face of an authenticating user (300), automatically altering the authentication image for presentation on a display of a computing device (302), presenting the authentication image on the display (304), and comparing the authentication image to a digital enrollment image to determine whether to unlock the computing device for use by the authenticating user (306). The enrollment image represents a face of an authorized user of the computing device.

For purposes of illustration only, the method of FIG. 3 is described below as carried out using computing device 200 of FIG. 2 including facial recognition engine 218 and image processing engine 220. However, in other examples according to this disclosure, the functions of the method of FIG. 3 may be carried out using a number of different types of computing devices, both in form, componentry, and overall functionality. As noted above, for example, computing devices employed in examples according to this disclosure may include, be, or be part of one or more of a variety of types of devices, such as a mobile phone, tablet computer, netbook, laptop, desktop, personal digital assistant ("PDA"), set-top box, television, biometric door lock, and watch, among others.

The example method of FIG. 3 includes capturing a digital authentication image of a face of an authenticating user (300). In one example, front-facing camera 214 of computing device 200 is employed to capture a still or motion image of the face of the authenticating user. In one example, computing device 200, e.g., processor(s) 202 may control camera 214 to capture a reference image. In some instances, processor(s) 202 of computing device 200 may deactivate a light source, such as flashbulb(s) 216, a display-based light source, etc. before capturing the reference image. In other cases, processor(s) 202 may activate a light source, such as flashbulb(s) 216 before capturing the reference image. Processor(s) 202 may analyze the reference image to detect whether or not a representation of a human face is present in the reference image. If no face is present in the reference image, processor(s) 202 may control camera 214 to capture the reference image again, either automatically, or by prompting the authenticating user to submit another reference image. In one example, if processor(s) 202 of computing device 200 successfully detect the face in the reference image, processor(s) 202 may control camera 214 to capture the authentication image (300). At the time of capturing the authentication image, processor(s) 202 of computing device 200 may activate one or more light sources, such as flashbulb(s) 216.

The method of FIG. 3 also includes automatically altering the authentication image for presentation on a display of a computing device (302). In one example, image processing engine 220 may process the authentication image to automatically alter or "beautify" the facial image for presentation on a display of output device(s) 210 of computing device 200. Image processing engine 220 may implement one or more image processing techniques to alter the authentication image of the face of user attempting to gain access to computing device 200 as part of a facial recognition device unlock procedure. For example, image processing engine 220 may alter at least one of contrast or brightness levels of one or more portions of the face of the user captured in the authentication image by camera 214 of computing device 200. Contrast and/or brightness levels may be altered by image processing engine 220, e.g., to improve the lighting conditions under which the authentication image was captured. In one example, image processing engine 220 may use various techniques to alter the contrast and/or brightness levels of the authentication image to simulate diffuse lighting conditions, which may be perceived as producing more flattering facial images. For example, image processing engine 220 may employ a technique referred to as shadow removal in which the engine analyzes localized portions of the authentication images for contrast and modifies certain portions based on the level of contrast in the captured image. For example, image processing engine 220 may identify darker portions of the authentication image and increase the contrast in these portions.

In another example, image processing engine 220 may analyze the authentication image to generate a mathematical model of the lighting conditions under which the image was captured. For example, image processing engine 220 may determine the reflectance properties of portions of the face represented in the authentication image using a bidirectional reflectance distribution function, which is a four-dimensional function that defines how light is reflected at an opaque surface. By determining reflectance on different portions of the face, image processing engine 220 may model the direction from which light came and was reflected off of the face in the authentication image. After generating the model of lighting conditions, image processing engine 220 may modify the lighting conditions by simulating moving or otherwise changing the lighting under which the authentication image was captured.

In one example, image processing engine 220 may apply a high-pass and/or a low-pass filter to the entire or select portions of the authentication image. Frequency filters process an image in the frequency domain and function to attenuate certain frequencies while passing others. Frequency filters apply a Fourier transform to digital image data, e.g., pixel data to transform the data from the spatial to the frequency domain. The filters then multiply the image data with a filter function and then re-transformed from the frequency back to the spatial domain. A high-pass filter (HPF) is an electronic filter that passes high-frequency signals but attenuates (reduces the amplitude of) signals with frequencies lower than a threshold frequency. A low-pass filter (LPF) is an electronic filter that passes low-frequency signals but attenuates (reduces the amplitude of) signals with frequencies higher than a threshold frequency. Attenuating high frequencies may function to produce a smoother image in the spatial domain, while attenuating low frequencies may function to enhance the edges. In one example, therefore, image processing engine 220 may apply a LPF to the authentication image to remove or reduce wrinkles in the skin of the face of the user. In one example, image processing engine 220 may apply a HPF to the authentication image to reduce local contrast in parts of the face of the user in order to simulate highly diffuse lighting conditions.

It may not be desirable or efficient to apply alterations to all portions of the face of a user in an image. For example, it may not be necessary or desirable to apply a LPF to facial hair or hair on the user's head, or other areas that have a high level of texture. In one example, facial recognition engine 218 of computing device 200 may be configured to identify portions of the face of user. For example, facial recognition engine 218 may be configured to distinguish between skin and hair and identify landmarks like the eyes, ears, and nose of a user. In one example, facial recognition engine 218 of computing device 200 identifies a number of portions of the face of the authenticating user in the authentication image and image processing engine 220 applies frequency filters, or other image alteration techniques, to only selection portions of the face.

In one example, image processing engine 220 may apply one or more color transformations to areas of the face of the user captured in the authentication image that are identified as including skin. In one example, the foregoing techniques for identifying particular portions of the face of the use may be employed by facial recognition engine 218 to identify the portions of the face including skin. In addition, image processing engine 220 may also analyze the color of different portions of the face in the authentication image to identify those portions including skin. After the skin of the face in the authentication image is identified, image processing engine 220 may apply a color transformation by which the color of individual pixels or blocks of pixels representing skin in the authentication image is altered, e.g. darkened or otherwise transform the color of a pixel or block from one value to another.

In one example, image processing engine 220 may apply a transform function associated with the lens of front-facing camera 214 to correct geometric distortions in the authentication image caused by the lens. Camera lens optics may be represented in a mathematical model associated with a particular lens. The model may be employed to generate a transform function that may be applied to a digital image to correct geometric distortions caused by the lens. In one example, the mathematical model of the lens of front-facing camera 214 of computing device 200 may be stored in memory 204 and/or storage device(s) 206. Image processing engine 220 may retrieve the model from the storage device(s) of computing device and apply the transform function to the authentication image to correct or reduce geometric distortions in the image. In one example, image processing engine 220 may employ any two or more of the foregoing techniques, or other image processing techniques in combination in the process of automatically altering the authentication image for presentation on a display of output device(s) 210 of computing device 200.

The example method of FIG. 3 also includes presenting the authentication image on the display (304) and comparing the authentication image to a digital enrollment image to determine whether to unlock the computing device for use by the authenticating user (306). Processor(s) 202 of computing device 200 may control a display of output device(s) 210 to present the altered authentication image to the user. In a manner the same or similar as described above with reference to FIG. 2, facial recognition engine 218 of computing device 200 may compare the authentication image to an enrollment image of an authorized user, e.g. stored in memory 204 and/or storage device(s) 206 to determine whether to unlock the computing device for use by the authenticating user. In some examples, facial recognition engine 218 of computing device 200 may compare the authentication image after the image has been altered by image processing engine 220 to an enrollment image of the authorized user. However, in some cases, the alterations to the authentication image executed by image processing engine 220 may be irrelevant and, in some cases, may be inappropriate for the facial recognition step of comparing the authentication image to the enrollment image. As such, in some examples, facial recognition engine 218 of computing device 200 may compare, to the enrollment image of the authorized user, the authentication image as originally captured and before the image has been altered by image processing engine 220.

Prior to executing the functions of the example method of FIG. 3 described above, computing device 200 may also be employed to capture and store one or more enrollment images of one or more authorized users of the device. For example, an authorized user may gain access to computing device 200, e.g. by using authentication credentials like a username and password or pin number, and may use camera 214 to capture an enrollment image for use in a facial recognition unlock procedure for unlocking computing device 200 for use. In one example, the authorized user employs front-facing camera 214 to capture an enrollment image of the face of the user and computing device 200 stores the enrollment image, e.g., using memory 204 and/or storage device(s) 206. It is also noted that, in addition to automatically altering an authentication image for presentation on a display of output device(s) 210 of computing device 200 (302) as part of a facial recognition unlock process, the enrollment images of authorized users of computing device 200 may also be similarly automatically altered by image processing engine 220.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
  capturing, by an image capture device of a computing device, a digital authentication image of a face of an authenticating user;
  generating, by the computing device and based on the digital authentication image, an altered authentication image at least in part by:
    using, by the computing device, a mathematical model to represent a lens of the image capture device, the mathematical model representing one or more distortions introduced by the lens with respect to digital authentication image;
    determining, by the computing device and based on the mathematical model, one or more transform functions to correct the one or more distortions introduced with respect to the digital authentication image; and
    applying the one or more transform functions to the digital authentication image to generate the altered authentication image;
  presenting the altered authentication image for display; and
  comparing, by the computing device, the digital authentication image, in an unaltered form, to a digital enrollment image to determine whether to unlock the computing device for use by the authenticating user,
  wherein the digital enrollment image represents a face of an authorized user of the computing device, and wherein the comparison does not include any correction of the one or more distortions introduced into the digital authentication image.

2. The method of claim 1, wherein the digital authentication image comprises at least one of a still image and a portion of a digital video of the face of the user captured by the image capture device.

3. The method of claim 1, further comprising automatically altering the digital enrollment image for presentation at a display of the computing device.

4. The method of claim 1, wherein generating the altered authentication image further comprises altering at least one of contrast and brightness levels of one or more portions of the digital authentication image.

5. The method of claim 1, wherein generating the altered authentication image further comprises applying a high-pass filter to the digital authentication image.

6. The method of claim 5, further comprising identifying, in the digital authentication image, respective representations of one or more portions of the face of the authenticating user, wherein applying the high-pass filter to the digital authentication image comprises selecting one or more of the identified portions of the face of the authenticating user to which to apply the high-pass filter.

7. The method of claim 1, wherein generating the altered authentication image comprises applying a low-pass filter to the digital authentication image.

8. The method of claim 7, further comprising identifying, in the digital authentication image, respective representations of one or more portions of the face of the authenticating user, wherein applying the low-pass filter to the digital authentication image comprises selecting one or more of the identified portions of the face of the authenticating user to which to apply the low-pass filter.

9. The method of claim 1, further comprising:
identifying, in the digital authentication image, respective representations of portions of the face of the authenticating user comprising representations of skin; and
applying a color transformation to the identified representations of the portions of the face of the authenticating user comprising the representations of skin.

10. A computing device comprising:
an image capture device configured to capture a digital enrollment image of a face of an authorized user and a digital authentication image of a face of an authenticating user;
and
at least one processor configured to:
generate, based on the digital authentication image, an altered authentication image, wherein, to generate the altered authentication image, the at least one processor is configured to:
use a mathematical model to represent a lens of the image capture device, the mathematical model representing one or more distortions introduced by the lens with respect to the digital authentication image;
determine, based on the mathematical model, one or more transform functions to correct the one or more distortions introduced with respect to the digital authentication image; and
apply the one or more transform functions to the digital authentication image to generate the altered authentication image; control the display to present the altered authentication image; and
compare the digital authentication image, in an unaltered form, to the digital enrollment image to determine whether to unlock the computing device for use by the authenticating user, wherein the comparison does not include any correction of the one or more distortions introduced into the digital authentication image.

11. The device of claim 10, wherein the digital authentication image comprises at least one of a still image and a portion of a digital video of the face of the user captured by the image capture device.

12. The device of claim 10, wherein the at least one processor is configured to automatically alter the enrollment image for presentation at the display of the computing device.

13. The device of claim 10, wherein, to generate the altered authentication image, the at least one processor is configured to alter at least one of contrast and brightness levels of one or more portions of the digital authentication image.

14. The device of claim 10, wherein, to generate the altered authentication image, the at least one processor is configured to apply a high-pass filter to the digital authentication image.

15. The device of claim 14, wherein the at least one processor is further configured to:
identify, in the digital authentication image, respective representations of one or more portions of the face of the authenticating user, and
select one or more of the identified portions of the face of the authenticating user to which to apply the high-pass filter.

16. The device of claim 10, wherein, to generate the altered authentication image, the at least one processor is configured to apply a low-pass filter to the digital authentication image.

17. The device of claim 16, wherein the at least one processor is further configured to:
identify, in the digital authentication image, respective representations of one or more portions of the face of the authenticating user; and
select some of the identified portions of the face of the authenticating user to which to apply the low-pass filter.

18. The device of claim 10, wherein the at least one processor is configured to:
identify, in the digital authentication image, respective representations of portions of the face of the authenticating user comprising skin; and
apply a color transformation to the identified representations of the portions of the face of the authenticating user comprising the representations of skin.

19. A computer-readable storage device, having stored thereon instructions that, when executed, cause at least one programmable processor to perform operations comprising:
capturing, by an image capture device of a computing device, a digital authentication image of a face of an authenticating user,
generating, based on the digital authentication image, an altered authentication image, at least in part by:
using a mathematical model to represent a lens of the image capture device, the mathematical model representing one or more distortions introduced by the lens with respect to the digital authentication image;
determining, based on the mathematical model, one or more transform functions to correct the one or more distortions introduced with respect to the digital authentication image; and
applying the one or more transform functions to the digital authentication image to generate the altered authentication image;
presenting the altered authentication image for display; and comparing the digital authentication image, in an unaltered form, to a digital enrollment image to determine whether to unlock the computing device for use by the authenticating user,
wherein the digital enrollment image represents a face of an authorized user of the computing device, and
wherein the comparison does not include any correction of the one or more distortions introduced into the digital authentication image.

* * * * *